United States Patent
Wang et al.

(10) Patent No.: US 12,378,402 B2
(45) Date of Patent: Aug. 5, 2025

(54) RESIN COMPOSITION AND ARTICLE MADE THEREFROM

(71) Applicant: Elite Electronic Material (KunShan) Co., Ltd., Kunshan (CN)

(72) Inventors: Rongtao Wang, Kunshan (CN); Chenyu Shen, Kunshan (CN); Yiqiang Ge, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 483 days.

(21) Appl. No.: 18/088,139

(22) Filed: Dec. 23, 2022

(65) Prior Publication Data
US 2024/0182702 A1    Jun. 6, 2024

(30) Foreign Application Priority Data

Nov. 21, 2022  (CN) .......................... 202211462104.5

(51) Int. Cl.
| | | |
|---|---|---|
| *C08L 53/02* | (2006.01) | |
| *C08J 5/24* | (2006.01) | |
| *C08L 71/12* | (2006.01) | |

(52) U.S. Cl.
CPC .............. *C08L 53/02* (2013.01); *C08J 5/244* (2021.05); *C08L 71/123* (2013.01); *C08J 2353/02* (2013.01); *C08J 2371/12* (2013.01); *C08J 2453/02* (2013.01); *C08J 2471/12* (2013.01); *C08L 2205/025* (2013.01); *C08L 2205/035* (2013.01)

(58) Field of Classification Search
CPC .. C08L 53/02; C08L 71/123; C08L 2205/025; C08L 2205/035; C08L 71/12; C08L 71/126; C08L 25/02; C08L 25/08; C08L 25/16; C08L 53/00; C08L 2203/20; C08J 5/244; C08J 2353/02; C08J 2371/12; C08J 2453/02; C08J 2471/12; C08J 5/249; C08J 5/18; C08J 2325/00; C08J 2325/08; C08J 2325/16; C08J 2353/00; C08J 2371/02; C08F 290/062; H05K 1/036; H05K 1/0366; C08K 7/14
See application file for complete search history.

(56) References Cited

U.S. PATENT DOCUMENTS

| | | | | |
|---|---|---|---|---|
| 4,540,763 | A * | 9/1985 | Kirchhoff | C07C 63/49 526/284 |
| 4,722,974 | A * | 2/1988 | Wong | C08F 297/04 525/289 |
| 4,724,260 | A * | 2/1988 | Kirchhoff | C07C 13/44 585/27 |
| 4,783,514 | A * | 11/1988 | Kirchhoff | C07C 13/44 526/284 |
| 4,999,449 | A * | 3/1991 | Kirchhoff | C07C 13/44 560/1 |
| 11,337,309 | B2 * | 5/2022 | Aoude | H05K 3/0026 |
| 2006/0264065 | A1 * | 11/2006 | So | H01L 21/7682 438/785 |

OTHER PUBLICATIONS

So, Ying-Hung "Styrene 4-vinylbenzocyclobutene Copolymer for Microelectronic Applications," 2008, Journal of Polymer Science Part A: Polymer Chemistry, vol. 46, pp. 2799-2806. (Year: 2008).*

* cited by examiner

*Primary Examiner* — Robert S Jones, Jr.
*Assistant Examiner* — Joshua Caleb Bledsoe
(74) *Attorney, Agent, or Firm* — Muncy, Geissler, Olds & Lowe, P.C.

(57) ABSTRACT

A resin composition and an article made therefrom are provided. The resin composition includes: (A) 100 parts by weight of an unsaturated bond-containing polyphenylene ether resin; (B) 20 parts by weight to 150 parts by weight of a copolymer, the copolymer having a structural unit formed by a monomer of Formula (1) and a structural unit formed by a monomer of Formula (2), and the content of the structural unit formed by the monomer of Formula (2) in the copolymer is 55 wt % to 90 wt %; and (C) 10 parts by weight to 40 parts by weight of an unsaturated bond-containing crosslinking agent. The resin composition may be used to make various articles, such as a prepreg, a resin film, a laminate or a printed circuit board, and at least one of the following properties can be improved, including glass transition temperature, Z-axis ratio of thermal expansion, multi-layer board heat resistance, interconnect stress test, dissipation factor aging rate, temperature coefficient of dielectric constant, temperature coefficient of dissipation factor and branch-like pattern at laminate edges.

15 Claims, No Drawings

RESIN COMPOSITION AND ARTICLE MADE THEREFROM

CROSS-REFERENCE TO RELATED APPLICATION

This application claims the priority benefits of China Patent Application No. 202211462104.5, filed on Nov. 21, 2022. The entirety the above-mentioned patent application is hereby incorporated by reference herein and made a part of this specification.

BACKGROUND

1. Field of the Disclosure

The present disclosure mainly relates to a resin composition and an article made therefrom, more particularly to a resin composition useful for preparing a prepreg, a resin film, a laminate (e.g., a copper-clad laminate) and a printed circuit board, and an article made therefrom.

2. Description of Related Art

Printed circuit board (PCB), as a basic electronic component, is used in many fields such as communication, industrial control, consumer electronics, automotive electronics, aerospace, etc., the technical level thereof having direct impacts on technical stability and reliability of electronic equipment. With the development of technologies such as 5G and Internet of Things, the transmission rate and frequency of signals have been greatly improved. Copper-clad laminate (CCL), as a laminate material of PCB, mainly plays the role of interconnection and conduction, insulation and support for PCB, and has great effects on the transmission rate, energy loss and characteristic impedance of signals in circuits. The properties of PCB, such as performance, quality, processability in manufacturing, long-term reliability, stability, etc., depend on the quality of copper clad laminates to a large extent.

The current problems of process capability, signal integrity, heat dissipation and stress are faced by advanced PCB packaging technology, presenting more challenges to the performance of copper-clad laminates: higher density (such as high-density multilayer board), higher glass transition temperature (Tg), better dimensional stability (such as lower Z-axis ratio of thermal expansion, Z-PTE), better and more stable electrical properties (such as lower dissipation factor aging rate, lower temperature coefficient of dielectric constant (TcDk) and temperature coefficient of dissipation factor (TcDf)), etc. However, the current copper-clad laminates and the resin compositions used thereof still mainly focus on the general characteristics of copper-clad laminates.

Therefore, there is an urgent need in the art to develop a resin composition and an article such as a copper-clad laminate thereof with excellent interconnect structure reliability, lower dissipation factor aging rate, lower temperature coefficient of dielectric constant (TcDk) and temperature coefficient of dissipation factor (TcDf), at the same time having properties including high glass transition temperature (Tg), low Z-axis ratio of thermal expansion (Z-PTE), excellent multi-layer board heat resistance and good laminate appearance.

SUMMARY

To overcome the problems facing prior arts, particularly one or more of the above-mentioned technical problems of conventional materials, it is a primary object of the present disclosure to provide a resin composition and an article made therefrom which may overcome at least one of the above-mentioned technical problems.

To achieve the above-mentioned object, the present disclosure provides a resin composition, comprising: (A) 100 parts by weight of an unsaturated bond-containing polyphenylene ether resin; (B) 20 parts by weight to 150 parts by weight of a copolymer, the copolymer having a structural unit formed by a monomer of Formula (1) and a structural unit formed by a monomer of Formula (2), and the content of the structural unit formed by the monomer of Formula (2) in the copolymer is 55 wt % to 90 wt %; and (C) 10 parts by weight to 40 parts by weight of an unsaturated bond-containing crosslinking agent;

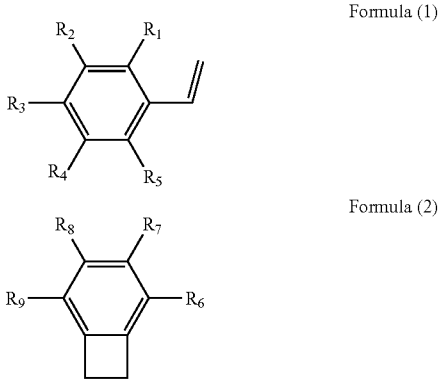

Formula (1)

Formula (2)

in Formula (1), $R_1$-$R_5$ are each independently selected from hydrogen atom, C1-C3 alkyl group, C2-C3 alkenyl group, phenyl group, phenyl group substituted by C1-C3 alkyl group, phenyl group substituted by C2-C3 alkenyl group and C2-C3 alkenyl phenyl C1-C3 alkylene;

in Formula (2), $R_6$-$R_9$ are each independently selected from hydrogen atom, C1-C3 alkyl group and C2-C3 alkenyl group, and at least one of $R_6$-$R_9$ is C2-C3 alkenyl group.

For example, in one embodiment, the unsaturated bond-containing polyphenylene ether resin comprises a vinylbenzyl group-containing polyphenylene ether resin, a (meth) acryloyl group-containing polyphenylene ether resin, a vinyl group-containing polyphenylene ether resin or a combination thereof.

For example, in one embodiment, the copolymer comprises a block copolymer, a random copolymer or a combination thereof.

For example, in one embodiment, the monomer of Formula (1) comprises a monomer of Formula (1-1), a monomer of Formula (1-2), a monomer of Formula (1-3), a monomer of Formula (1-4) or a combination thereof, and the monomer of Formula (2) comprises a monomer of Formula (2-1),

Formula (1-1)

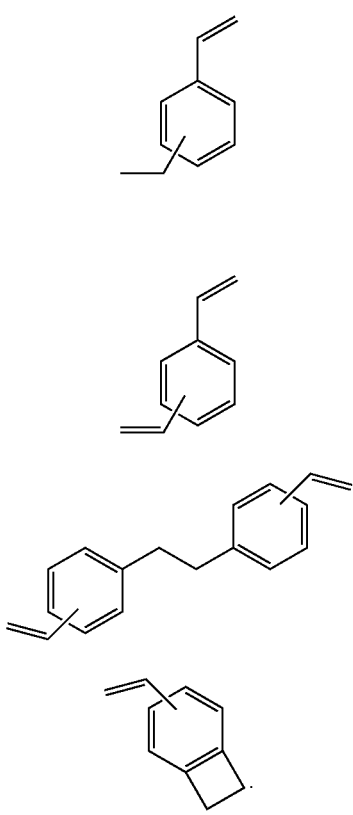
For example, in one embodiment, the copolymer comprises any copolymer of Formula (3) to Formula (18) below or a combination thereof:
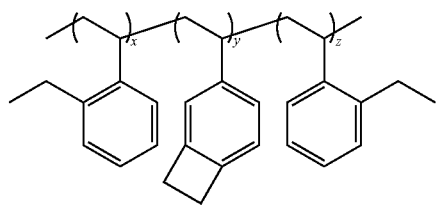
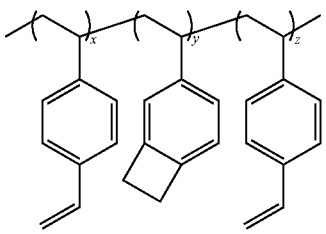
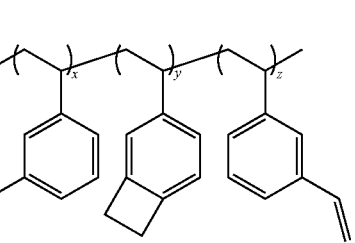
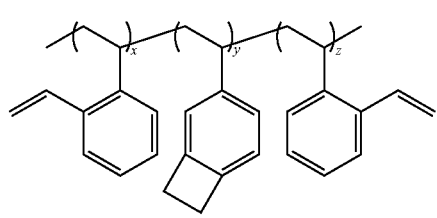
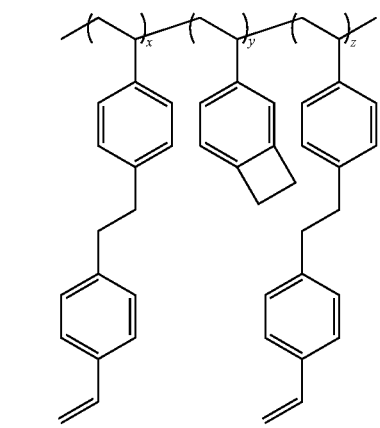
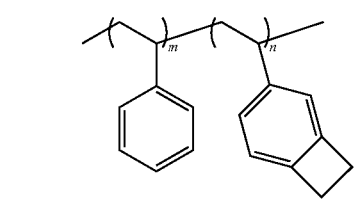

-continued

Formula (12)
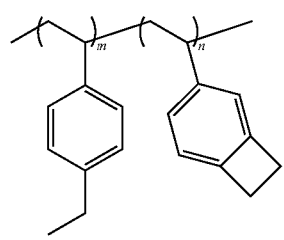

Formula (13)
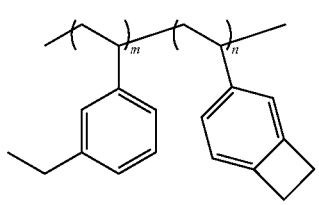

Formula (14)
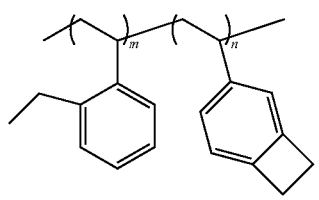

Formula (15)
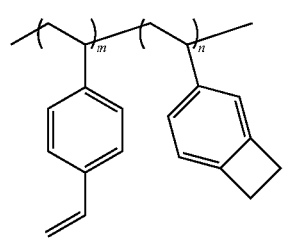

Formula (16)
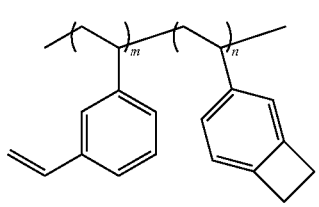

Formula (17)
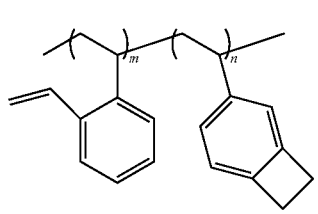

-continued

Formula (18)
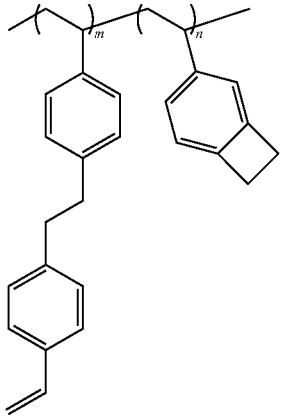

wherein m, n, x, y and z are each independently a positive integer, 2≤m≤44, 12≤n≤70, 2≤x+z≤44, and 12≤y≤70.

For example, in one embodiment, the unsaturated bond-containing crosslinking agent is bis(vinylphenyl)ethane, divinylbenzene, divinylnaphthalene, divinylbiphenyl, t-butyl styrene, triallyl isocyanurate, triallyl cyanurate, vinylbenzocyclobutene, bis(vinylbenzyl)ether, 1,2,4-trivinyl cyclohexane, diallyl isophthalate, diallyl bisphenol A, acrylate, butadiene, decadiene, octadiene, vinylcarbazole, styrene or a combination thereof.

For example, in one embodiment, the resin composition further comprises a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin, a polyfunctional vinyl aromatic copolymer or a combination thereof.

For example, in one embodiment, the resin composition further comprises inorganic filler, flame retardant, curing accelerator, polymerization inhibitor, solvent, silane coupling agent, coloring agent, toughening agent or a combination thereof.

To achieve the above-mentioned objects, the present disclosure further provides an article made from the aforesaid resin composition, including a prepreg, a resin film, a laminate or a printed circuit board.

For example, in one embodiment, the article described above has at least one, more or all of the following properties:
  a glass transition temperature as measured by reference to IPC-TM-650 2.4.24.4 of greater than or equal to 230° C.;
  a Z-axis ratio of thermal expansion as measured by reference to IPC-TM-650 2.4.24.5 of less than or equal to 1.5%;
  a resistance variation rate of less than 10% in an interconnect stress test as measured by reference to IPC-TM-650 2.6.26 after 1000 cycles;
  a dissipation factor aging rate of less than or equal to 82% calculated according to
  a dissipation factor as measured by reference to JIS C2565 at 10 GHz after being subject to standing still at 125° C. for 240 hours;
  a temperature coefficient of dielectric constant as measured by reference to IPC-TM-650 2.5.5.13 of less than or equal to 4.9 ppm/° C.; and a temperature coefficient of dissipation factor as measured by reference to IPC-TM-650 2.5.5.13 of less than or equal to 2500 ppm/° C.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition comprising a list of elements or an article made therefrom encompasses any one or any type of the listed elements and is not necessarily limited to only those elements listed herein, but may also include other elements not expressly listed or inherent to such composition or article. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

As used herein, "or a combination thereof" means "or any combination thereof" encompasses any combination of two or more of the listed elements, and "any" means "any one", vice versa. For example, "a composition or an article made therefrom includes A, B, C or a combination thereof" is construed to encompass the following situations: A is true (or present), and B and C are false (or not present); B is true (or present), and A and C are false (or not present); C is true (or present), and A and B are false (or not present); A and B are true (or present), and C is false (or not present); A and C are true (or present), and B is false (or not present); B and C are true (or present), and A is false (or not present); A and B and C are all true (or present), and other elements not expressly listed but inherent to such composition or article.

As used herein, the term "and" or any other variant thereof is used to connect parallel sentence components, and there is no distinction between the front and rear components. The meaning of the parallel sentence components does not change in the grammatical sense after the position is exchanged.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. A copolymer refers to the polymer formed by the polymerization of two or more types of monomers. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer or a styrene-butadiene block copolymer. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

The unsaturated C=C double bond as used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

Unless otherwise specified, the alkyl group, the alkenyl group and the monomer described herein are construed to encompass various isomers thereof. For example, a propyl group is construed to encompass n-propyl and iso-propyl.

Unless otherwise specified, as used herein, part(s) by weight represents weight part(s) in any weight unit in the resin composition, such as but not limited to kilogram, gram, pound and so on. For example, 100 parts by weight of an unsaturated bond-containing polyphenylene ether resin may represent 100 kilograms of the unsaturated bond-containing polyphenylene ether resin or 100 pounds of the unsaturated bond-containing polyphenylene ether resin.

Unless otherwise specified, in the present disclosure, wt % represents weight (or mass) percentage.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

As described above, the primary object of the present disclosure is to provide a resin composition, comprising: (A) 100 parts by weight of an unsaturated bond-containing polyphenylene ether resin; (B) 20 parts by weight to 150 parts by weight of a copolymer, the copolymer having a structural unit formed by a monomer of Formula (1) and a structural unit formed by a monomer of Formula (2), and the content of the structural unit formed by the monomer of Formula (2) in the copolymer is 55 wt % to 90 wt %; and (C) 10 parts by weight to 40 parts by weight of an unsaturated bond-containing crosslinking agent;

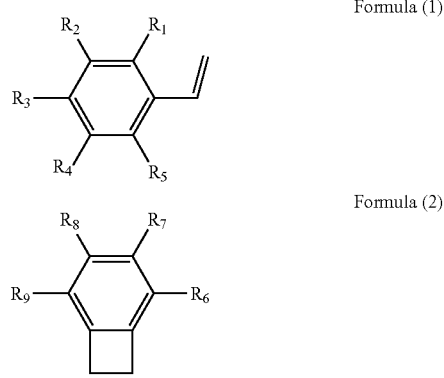

in Formula (1), $R_1$-$R_5$ are each independently selected from hydrogen atom, C1-C3 alkyl group (e.g., methyl, ethyl or propyl), C2-C3 alkenyl group (e.g., vinyl or allyl), phenyl group, phenyl group substituted by C1-C3 alkyl group (e.g., ethylphenyl), phenyl group substituted by C2-C3 alkenyl group (e.g., vinylphenyl) and C2-C3 alkenyl phenyl C1-C3 alkylene (e.g., vinylphenyl ethylene); in Formula (2), $R_6$-$R_9$ are each independently selected from hydrogen atom, C1-C3 alkyl group (e.g., methyl, ethyl or propyl) and C2-C3 alkenyl group (e.g., vinyl or allyl), and at least one of $R_6$-$R_9$ is C2-C3 alkenyl group (e.g., vinyl or allyl).

In one embodiment, for example, the unsaturated bond-containing polyphenylene ether resin suitable for the present disclosure is not particularly limited and may include any one or more unsaturated bond-containing polyphenylene ether resins useful for making a prepreg, a resin film, a laminate, or a printed circuit board, such as any one or more commercial products, products prepared by the Applicant or a combination thereof. Examples include, but not limited to, a vinylbenzyl group-containing polyphenylene ether resin, a (meth)acryloyl group-containing polyphenylene ether resin, a vinyl group-containing polyphenylene ether resin or a combination thereof.

The unsaturated bond-containing polyphenylene ether resin of the present disclosure has an unsaturated bond and a phenylene ether skeleton, wherein the unsaturated bond is a reactive group which may perform self-polymerization under heat and may also perform free radical polymerization with other components containing an unsaturated bond in the resin composition and finally result in crosslinking and curing. The cured product thereof has high heat resistance and good dielectric properties. Preferably, the unsaturated bond-containing polyphenylene ether resin comprises an unsaturated bond-containing polyphenylene ether resin with 2,6-dimethyl substitution in its phenylene ether skeleton, wherein the methyl groups form steric hindrance to prevent the oxygen atom of the ether group from forming a hydrogen bond or Van der Waals force to ab sorb moisture, thereby achieving better dielectric properties.

For example, in some embodiments, the unsaturated bond-containing polyphenylene ether resin may comprise, but not limited to, a vinylbenzyl group-containing polyphenylene ether resin with a number average molecular weight of about 1200 (such as OPE-2st 1200, available from Mitsubishi Gas Chemical Co., Inc.), a vinylbenzyl group-containing polyphenylene ether resin with a number average molecular weight of about 2200 (such as OPE-2st 2200, available from Mitsubishi Gas Chemical Co., Inc.), a vinylbenzyl group-containing polyphenylene ether resin with a number average molecular weight of about 2400 to 2800 (such as a vinylbenzyl group-containing bisphenol A polyphenylene ether resin), a (meth)acryloyl group-containing polyphenylene ether resin with a number average molecular weight of about 1900 to 2300 (such as SA9000, available from Sabic), a vinyl group-containing polyphenylene ether resin with a number average molecular weight of about 2200 to 3000, or a combination thereof. The vinyl group-containing polyphenylene ether resin may include various polyphenylene ether resins disclosed in the US Patent Application Publication No. 20160185904A1, all of which are incorporated herein by reference in their entirety. The vinylbenzyl group-containing polyphenylene ether resin may comprise, but not limited to, a vinylbenzyl group-containing biphenyl polyphenylene ether resin, a vinylbenzyl group-containing bisphenol A polyphenylene ether resin or a combination thereof.

Relative to 100 parts by weight of the unsaturated bond-containing polyphenylene ether resin, the resin composition according to the present disclosure comprises 20 parts by weight to 150 parts by weight of a copolymer, the copolymer having a structural unit formed by a monomer of Formula (1) and a structural unit formed by a monomer of Formula (2). The content of the structural unit formed by the monomer of Formula (2) in the copolymer is 55 wt % to 90 wt %, preferably 60 wt % to 90 wt % and more preferably 75 wt % to 90 wt %. For example, the content of the structural unit formed by the monomer of Formula (2) in the copolymer may be 55 wt %, 60 wt %, 65 wt %, 70 wt %, 75 wt %, 77.7 wt %, 80 wt %, 85 wt % or 90 wt %, but not limited thereto.

In one embodiment, for example, the copolymer is preferably a random copolymer or a block copolymer, more preferably a block copolymer.

In one embodiment, for example, the monomer of Formula (1) comprises a monomer of Formula (1-1), a monomer of Formula (1-2), a monomer of Formula (1-3), a monomer of Formula (1-4) or a combination thereof, and the monomer of Formula (2) comprises a monomer of Formula (2-1).

In one embodiment, for example, the copolymer comprises any copolymer of Formula (3) to Formula (18) or a combination thereof. In Formula (3) to Formula (18), m, n, x, y and z are each independently a positive integer and conform to the following relationship: $2 \leq m \leq 44$, $12 \leq n \leq 70$, $2 \leq x+z \leq 44$, and $12 \leq y \leq 70$. For example, m=2, 4, 5, 6, 7, 8, 9, 10, 11, 12, 20, 25, 30, 35, 40 or 44; n=12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70; x+z=2, 4, 5, 6, 7, 8, 9, 10, 11, 12, 20, 25, 30, 35, 40 or 44; y=12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70, but not limited thereto. In addition, in Formula (3) to Formula (18), the content of the structural unit formed by the monomer of Formula (2) is 55 wt % to 90 wt %.

The copolymers of Formula (3) to Formula (18) are exemplary only, and the form of the copolymer is not limited thereto, wherein the copolymers of Formula (3) to Formula (10) may be construed as block copolymers, and the copolymers of Formula (11) to Formula (18) may be construed as random copolymers.

The copolymer described herein which contains a structural unit formed by a monomer of Formula (1) and a structural unit formed by a monomer of Formula (2) may be prepared by various methods known by those having ordinary skilled in the art. For example, the copolymer may be prepared by the following processes:

1. The copolymer containing a structural unit formed by a monomer of Formula (1) and a structural unit formed by a monomer of Formula (2) is a block copolymer.

At 0° C. to 40° C., under the condition of an inert atmosphere, a solvent and an anion initiator were added into a reaction vessel and then stirred rapidly. First, "a" gram of the first monomer of Formula (1) was added and reacted for 4 to 18 hours, then "b" gram of monomer of Formula (2) was added and continued to react for 4 to 18 hours, and finally "c" gram of the second monomer of Formula (1) was added and continued to react for 4 to 18 hours to obtain the block copolymer. The first monomer of Formula (1) and the second monomer of Formula (1) may be the same or different, and a, b and c satisfy the following relationship: $(b/(a+b+c))*100\% = 55\%\text{-}90\%$.

The solvent in the above step may be, such as but not limited to, a polar solvent (e.g., tetrahydrofuran) or a non-polar solvent (e.g., cyclohexane), preferably tetrahydrofuran.

The anion initiator in the above step may be, such as but not limited to, n-butyllithium or tert-butyllithium, preferably n-butyllithium.

The inert atmosphere in the above step may be, such as but not limited to, argon atmosphere or nitrogen atmosphere, preferably argon atmosphere.

2. The copolymer containing a structural unit formed by a monomer of Formula (1) and a structural unit formed by a monomer of Formula (2) is a random copolymer.

Under the condition of 20° C. to 70° C., a solvent and a mixture of the monomer of Formula (1) and the monomer of Formula (2) were added into a reaction vessel (wherein the mass content of the monomer of Formula (2) in the mixture is 55 wt % to 90 wt %, and the total molar amount of the mixture is "d" mole), and the reaction was stirred, mixed well, and then added with a cationic initiator (the mole amount is "e" mole) to react for 4 to 72 hours to obtain the random copolymer having a content of the structural unit formed by the monomer of Formula (2) of 55 wt % to 90 wt %. "d" and "e" satisfy the following relationship: $(e/d)*100\% = 0.5\%\text{-}2\%$.

The solvent in the above step may be, such as but not limited to, n-propyl acetate, n-butyl acetate or tetrahydrofuran, preferably n-propyl acetate.

The cationic initiator in the above step may be, such as but not limited to, boron trifluoride diethyl ether, boron trifluoride methyl ether or aluminum trichloride, preferably boron trifluoride diethyl ether.

Relative to 100 parts by weight of the unsaturated bond-containing polyphenylene ether resin, the resin composition according to the present disclosure comprises 10 parts by weight to 40 parts by weight of an unsaturated bond-containing crosslinking agent. The unsaturated bond-containing crosslinking agent suitable for the present disclosure refers to a small molecule compound with a molecular weight of less than or equal to 1000, preferably between 100 and 900 and more preferably between 100 and 800. For example, the unsaturated bond-containing crosslinking agent may be any one of bis(vinylphenyl)ethane (BVPE), divinylbenzene (DVB), divinylnaphthalene, divinylbiphenyl, t-butyl styrene, triallyl isocyanurate (TAIC), triallyl cyanurate (TAC), vinylbenzocyclobutene (VB CB), bis(vinylbenzyl)ether (BVBE), 1,2,4-trivinyl cyclohexane (TVCH), diallyl isophthalate (DAIP), diallyl bisphenol A (DABPA), acrylate, butadiene, decadiene, octadiene, vinylcarbazole, styrene or a combination thereof, but not limited thereto.

Unless otherwise specified, according to the resin composition of the present disclosure, the amount of each component contained in the resin composition is represented as the amount relative to 100 parts by weight of the unsaturated bond-containing polyphenylene ether resin. For example, but not limited thereto, relative to a total of 100 parts by weight of the unsaturated bond-containing polyphenylene ether resin, the total amount of the copolymer having a structural unit formed by a monomer of Formula (1) and a structural unit formed by a monomer of Formula (2) may be 20 parts by weight to 150 parts by weight, preferably 50 parts by weight to 130 parts by weight and more preferably 70 parts by weight to 120 parts by weight. For example, relative to a total of 100 parts by weight of the unsaturated bond-containing polyphenylene ether resin, the total amount of the copolymer having a structural unit formed by a monomer of Formula (1) and a structural unit formed by a monomer of Formula (2) may be 20, 30, 40, 50, 60, 70, 80, 90, 100, 110.5, 120, 130, 142 or 150 parts by weight. For example, but not limited thereto, relative to a total of 100 parts by weight of the unsaturated bond-containing polyphenylene ether resin, the total amount of the unsaturated bond-containing crosslinking agent may be 10 parts by weight to 40 parts by weight, preferably 20 parts by weight to 30 parts by weight. For example, relative to a total of 100 parts by weight of the unsaturated bond-containing polyphenylene ether resin, the total amount of the unsaturated bond-containing crosslinking agent may be 10 parts by weight, 15 parts by weight, 20 parts by weight, 25.6 parts by weight, 30 parts by weight, 33 parts by weight or 40 parts by weight.

For example, in one embodiment, the resin composition described herein may further optionally comprise a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin, a polyfunctional vinyl aromatic copolymer or a combination thereof.

According to the present disclosure, for example, the benzoxazine resin may be any benzoxazine resins known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin and phenyl group-modified, vinyl group-modified or allyl group-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) and KZH-5032 (phenyl-modified benzoxazine resin) available from Kolon Industries Inc. The diamino benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

Unless otherwise specified, the amount of the benzoxazine resin used in the present disclosure may be adjusted as needed; for example, but not limited thereto, relative to 100 parts by weight of the unsaturated bond-containing polyphenylene ether resin, the amount of the benzoxazine resin may be 10 to 100 parts by weight, such as 10 parts by weight, 15 parts by weight, 20 parts by weight, 30 parts by weight, 40 parts by weight, 50 parts by weight, 60 parts by weight, 70 parts by weight, 80 parts by weight, 90 parts by weight or 100 parts by weight.

According to the present disclosure, for example, the epoxy resin may be any epoxy resins known in the field to which this disclosure pertains. In terms of improving the heat resistance of the resin composition, the epoxy resin may include, but not limited to, bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenol novolac epoxy resin, DOPO-containing o-cresol novolac epoxy resin and DOPO-containing bisphenol-A novolac epoxy resin; the DOPO-HQ epoxy resin may be any one or more selected from DOPO-HQ-containing phenol novolac epoxy resin, DOPO-HQ-containing o-cresol novolac epoxy resin and DOPO-HQ-containing bisphenol-A novolac epoxy resin, but not limited thereto.

Unless otherwise specified, the amount of the epoxy resin used in the present disclosure may be adjusted as needed; for example, but not limited thereto, relative to 100 parts by weight of the unsaturated bond-containing polyphenylene ether resin, the amount of the epoxy resin may be 10 to 100 parts by weight, such as 10 parts by weight, parts by weight, 20 parts by weight, 30 parts by weight, 40 parts by weight, 50 parts by weight, 60 parts by weight, 70 parts by weight, 80 parts by weight, 90 parts by weight or 100 parts by weight.

According to the present disclosure, for example, the polyester resin may be any polyester resins known in the field to which this disclosure pertains. Examples include but are not limited to a dicyclopentadiene-containing polyester resin and a naphthalene-containing polyester resin. Examples include, but not limited to, HPC-8000 or HPC-8150 available from D.I.C. Corporation. Unless otherwise specified, the amount of the polyester resin used in the present disclosure may be adjusted as needed; for example, but not limited thereto, relative to 100 parts by weight of the unsaturated bond-containing polyphenylene ether resin, the amount of the polyester resin may be 10 to 80 parts by weight, such as 10 parts by weight, 15 parts by weight, 20 parts by weight, parts by weight, 40 parts by weight, 50 parts by weight, 60 parts by weight, 70 parts by weight or 80 parts by weight.

According to the present disclosure, for example, the phenolic resin may be any phenolic resin known in the field to which this disclosure pertains, examples including but not limited to phenoxy resin or novolac resin (such as phenol novolac resin, naphthol novolac resin, biphenyl novolac resin, and dicyclopentadiene phenol resin), but not limited thereto. Unless otherwise specified, the amount of the phenolic resin used in the present disclosure may be adjusted as needed; for example, but not limited thereto, relative to 100 parts by weight of the unsaturated bond-containing polyphenylene ether resin, the amount of the phenolic resin may be 10 to 80 parts by weight, such as 10 parts by weight, 15 parts by weight, 20 parts by weight, 30 parts by weight, 40 parts by weight, 50 parts by weight, 60 parts by weight, 70 parts by weight or 80 parts by weight.

According to the present disclosure, for example, the amine curing agent may be any amine curing agents known in the field to which this disclosure pertains. Examples include but are not limited to any one or a combination of diamino diphenyl sulfone, diamino diphenyl methane, diamino diphenyl ether, diamino diphenyl sulfide and dicyandiamide. Unless otherwise specified, the amount of the amine curing agent used in the present disclosure may be adjusted as needed; for example, but not limited thereto, relative to 100 parts by weight of the unsaturated bond-containing polyphenylene ether resin, the amount of the amine curing agent may be 1 to 15 parts by weight, such as 1 part by weight, 4 parts by weight, 7.5 parts by weight, 12 parts by weight or 15 parts by weight.

According to the present disclosure, for example, the polyamide may be any polyamides known in the field to which this disclosure pertains, including but not limited to various commercially available polyamide resin products.

According to the present disclosure, for example, the polyimide may be any polyimides known in the field to which this disclosure pertains, including but not limited to various commercially available polyimide resin products.

According to the present disclosure, for example, the styrene maleic anhydride may be any styrene maleic anhydrides known in the field to which this disclosure pertains, wherein the ratio of styrene (St) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto. The maleimide resin suitable for the resin composition of the present disclosure is not particularly limited and may include any one or more maleimide resins useful for preparing a prepreg, a resin film, a laminate or a printed circuit board. In some embodiments, the maleimide resin may be for example but not limited to: 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide containing a biphenyl structure, maleimide resin containing aliphatic long chain structure, prepolymer of diallyl compound and maleimide resin, prepolymer of diamine and maleimide resin, prepolymer of multifunctional amine and maleimide resin, prepolymer of acid phenol compound and maleimide resin, or a combination thereof. These components should be construed as including their modifications.

For example, the maleimide resin includes but is not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd., or products such as MIR-3000 and MIR-5000 available from Nippon Kayaku.

For example, the maleimide resin containing aliphatic long chain structure, also known as imide-extended maleimide resin, may include various imide-extended maleimide resins disclosed in the TW Patent Application Publication No. 200508284A, all of which are incorporated herein by reference in their entirety. The maleimide resin containing aliphatic long chain structure suitable for the present disclosure may include, but not limited to, products such as BMI-689, BMI-1400, BMI-1500, BMI-1700, BMI-2500, BMI-3000, BMI-5000 and BMI-6000 available from Designer Molecules Inc.

According to the present disclosure, for example, the cyanate ester may include any one or more cyanate ester resins useful for preparing a prepreg, a resin film, a laminate or a printed circuit board, such as a compound having an Ar—O—C≡T structure, wherein Ar may be a substituted or unsubstituted aromatic group. In terms of improving the heat resistance of the resin composition, examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy sold by Lonza.

For example, unless otherwise specified, the maleimide triazine resin used in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. For example, the maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, unless otherwise specified, the polyfunctional vinyl aromatic copolymer may include various polyfunctional vinyl aromatic copolymer disclosed in the US Patent Application Publication No. 20070129502A1, all of which are incorporated herein by reference in their entirety.

In addition to the aforesaid components, the resin composition disclosed herein may also further optionally comprise inorganic filler, flame retardant, curing accelerator, polymerization inhibitor, solvent, silane coupling agent, coloring agent, toughening agent, or a combination thereof.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (A100H), calcined talc, talc, silicon nitride, zirconium tungstate, petaliteor, calcined kaolin or a combination thereof. Moreover, the inorganic filler can be spherical (including solid sphere or hollow sphere), fibrous, plate-like, particulate, flake-like or whisker-like and can be optionally pretreated by a silane coupling agent. For example, in one embodiment, relative to 100 parts by weight of the unsaturated bond-containing polyphenylene ether resin, the resin composition of the present disclosure may further comprise 10 parts by weight to 240 parts by weight of inorganic filler, preferably 80 parts by weight to 170 parts by weight of inorganic filler, more preferably 100 parts by weight to 150 parts by weight of inorganic filler, but not limited thereto.

For example, the flame retardant may be any one or more flame retardants suitable for preparing a prepreg, a resin film, a laminate or a printed circuit board, such as but not limited to a phosphorus-containing flame retardant or a bromine-containing flame retardant. The bromine-containing flame retardant preferably includes decabromodiphenyl ethane, and the phosphorus-containing flame retardant preferably includes: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), or a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, DOPO-BPN and a DOPO-containing epoxy resin), wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac). For example, in one embodiment, relative to 100 parts by weight of the unsaturated bond-containing polyphenylene ether resin, the resin composition of the present disclosure may further comprise 10 parts by weight to 100 parts by weight of flame retardant, preferably 20 parts by weight to 80 parts by weight of flame retardant, but not limited thereto.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl) benzene or a combination thereof. For example, in one embodiment, relative to 100 parts by weight of the unsaturated bond-containing polyphenylene ether resin, the resin composition of the present disclosure may further comprise 0.001 part by weight to 2 parts by weight of curing accelerator, preferably 0.01 part by weight to 1.5 parts by weight of curing accelerator, more preferably 0.1 part by weight to 1.0 part by weight of curing accelerator, but not limited thereto.

For example, the polymerization inhibitor may comprise, but not limited to, 1,1-diphenyl-2-picrylhydrazyl radical, methyl acrylonitrile, nitroxide-mediated radical, triphenylmethyl radical, metal ion radical, sulfur radical (such as but not limited to dithioester), hydroquinone, 4-methoxyphenol, p-benzoquinone, phenothiazine, 3-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof. For example, the nitroxide-mediated radical may comprise, but not limited to, nitroxide radicals derived from cyclic hydroxylamines, such as 2,2,6,6-tetramethyl-1-oxo-piperidine, 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like. For example, in one embodiment, relative to 100 parts by weight of the unsaturated bond-containing polyphenylene ether resin, the resin composition of the present disclosure may further comprise 0.001 part by weight to 20 parts by weight of polymerization inhibitor, preferably 0.001 part by weight to 10 parts by weight of polymerization inhibitor, but not limited thereto.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, N-methyl-pyrrolidone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof. The amount of solvent is determined in view of the purpose of completely dissolving the resin and adjusting to a certain solid content of the whole resin composition. For example, in one embodiment, the amount of solvent is added to adjust the solid content of the whole resin composition to 50%-85%, but not limited thereto.

For example, the silane coupling agent may comprise silane (such as but not limited to siloxane), which may be further categorized according to the functional groups into amino silane, epoxide silane, vinyl silane, hydroxyl silane, isocyanate silane, methacryloxy silane and acryloxy silane. For example, in one embodiment, relative to 100 parts by weight of the unsaturated bond-containing polyphenylene ether resin, the resin composition of the present disclosure may further comprise 0.001 part by weight to 20 parts by weight of silane coupling agent, preferably 0.01 part by weight to 10 parts by weight of silane coupling agent, but not limited thereto.

For example, the coloring agent may comprise but is not limited to dye or pigment.

The purpose of toughening agent used herein is to improve the toughness of the resin composition. For example, the toughening agent may comprise, but not limited to, carboxyl-terminated butadiene acrylonitrile rubber (CTBN rubber), core-shell rubber, ethylene propylene rubber or a combination thereof. For example, in one embodiment, relative to 100 parts by weight of the unsaturated bond-containing polyphenylene ether resin, the resin composition of the present disclosure may further comprise 1 part by weight to 20 parts by weight of toughening agent, preferably 3 parts by weight to 10 parts by weight of toughening agent, but not limited thereto.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the B-stage. Suitable baking temperature for making a prepreg may be for example 120° C. to 180° C., preferably 120° C. to 160° C. For example, the reinforcement material may be any one of a fiber material, woven fabric, and non-woven fabric, and the woven fabric preferably comprises fiberglass fabrics. The types of fiberglass fabrics are not particularly limited and may be any fiberglass fabric used for various printed circuit boards, such as E-glass fabric, D-glass fabric, S-glass fabric, T-glass fabric, L-glass fabric, Q-glass fabric or QL-glass fabric (glass fabric with hybrid structure made of Q-glass and L-glass); the fiber may comprise yarns and rovings, in spread form or standard form, and the shape of terminal face may be round or flat. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can also be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a liquid crystal polymer film, a polytetrafluoroethylene film, a polyethylene terephthalate film (PET film), a polyimide film (PI film), a copper foil or a resin-coated copper, followed by heating and baking to semi-cure the resin composition to form the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 190° C. to 220° C. for 90 to 180 minutes to cure the insulation material of the prepregs. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties:

- a glass transition temperature as measured by reference to IPC-TM-650 2.4.24.4 of greater than or equal to 230° C., such as between 230° C. and 280° C.;
- a Z-axis ratio of thermal expansion as measured by reference to IPC-TM-650 2.4.24.5 of less than or equal to 1.5%, such as between 1.0% and 1.5%;
- no delamination after subjecting the article to a multi-layer board heat resistance test;
- a resistance variation rate of less than 10% in an interconnect stress test as measured by reference to IPC-TM-650 2.6.26 after 1000 cycles (i.e., passing the interconnect stress test);
- a dissipation factor aging rate of less than or equal to 82% calculated according to
- a dissipation factor as measured by reference to JIS C2565 at 10 GHz after being subject to standing still at 125° C. for 240 hours, such as between 35% and 82%;
- a temperature coefficient of dielectric constant as measured by reference to IPC-TM-650 2.5.5.13 of less than or equal to 4.9 ppm/° C., such as between 3.2 ppm/° C. and 4.9 ppm/° C.;
- a temperature coefficient of dissipation factor as measured by reference to IPC-TM-650 2.5.5.13 of less than or equal to 2500 ppm/° C., such as between 1498 ppm/° C. and 2466 ppm/° C.; and
- article appearance being absent of branch-like pattern.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

SA9000: (meth)acryloyl group-containing polyphenylene ether resin, available from Sabic.

OPE-2st 2200: vinylbenzyl group-containing polyphenylene ether resin, available from Mitsubishi Gas Chemical Co., Inc.

OPE-2st 1200: vinylbenzyl group-containing polyphenylene ether resin, available from Mitsubishi Gas Chemical Co., Inc.

Copolymers A1-A11 and B1-B4: prepared according to Synthesis Examples 1-12. The Copolymers A1-A11 are the copolymers disclosed herein (having a structural unit formed by a monomer of Formula (1) and a structural unit formed by a monomer of Formula (2), and the content of the structural unit formed by the monomer of Formula (2) in the copolymer being 55 wt % to 90 wt %); for Copolymers B1 and B2, the content of the structural unit formed by the monomer of Formula (2) in the copolymer is not in a range of 55 wt % to 90 wt %; Copolymer B3 is a homopolymer of the monomer of Formula (2), and it is placed under the column of copolymer for the convenience of side-by-side comparison; Copolymer B4 does not contain a structural unit formed by the monomer of Formula (2).

BVPE: bis(vinylphenyl)ethane, available from Linchuan Chemical Co., Ltd.

TAIC: triallyl isocyanurate, available from Kingyorker Enterprise Co., Ltd.

DVB: divinylbenzene, available from Shanghai Macklin Biochemical Co., Ltd.

VBCB: 4-vinylbenzocyclobutene, available from Chemtarget Technologies Co., Ltd.

B-3000: polybutadiene, available from Nippon Soda Co., Ltd.

Ricon 100: styrene-butadiene copolymer, available from Cray Valley.

SBS-A: styrene-butadiene-styrene triblock copolymer, available from Nippon Soda.

H-1051: hydrogenated butadiene-styrene copolymer, available from Asahi KASEI.

SC-2500 SVJ: spherical silica pre-treated by silane coupling agent, available from Admatechs.

25B: 2,5-dimethyl-2,5-di(t-butylperoxy)-3-hexyne, available from NOF Corporation. Toluene: available from Sinopec Group. The amount of toluene is shown as "PA" in the Tables to indicate a "proper amount" to represent an amount of toluene used to achieve a 60% to 68% solid content (S/C=60%-68%) of the whole resin composition.

Ethylvinylbenzene: a.k.a. ethylstyrene, available from Alfa Chemistry.

Synthesis Example 1: Preparation of St-VBCB-St Block Copolymer

Under the condition of 40° C., 1 L of dehydrated tetrahydrofuran (THF) was added into a Schlenk reaction flask, which was then vacuum-pumped in a liquid nitrogen environment and introduced with nitrogen, and the above operation was repeated three times; after that, the reaction was added with 0.0164 g of n-butyllithium and stirred rapidly. Styrene (hereinafter abbreviated as St) was first added, 4-vinylbenzocyclobutene (hereinafter abbreviated as VBCB) was then added after 10 hours of reaction, and St was added after continuous reaction of 10 hours (the mass ratio of the three reagents is 22.5:55:22.5, a total of 50 ml). After continuing the reaction for 10 hours, a compound of Formula (3) with a VBCB content of 55 wt % was obtained, wherein x+z=2-5, y=12-15, designated as A1.

Under the condition of 30° C., 1 L of dehydrated cyclohexane was added into a Schlenk reaction flask, which was then vacuum-pumped in a liquid nitrogen environment and introduced with nitrogen, and the above operation was repeated three times; after that, the reaction was added with 0.0087 g of n-butyllithium and stirred rapidly. St was first added, VBCB was then added after 18 hours of reaction, and St was added after continuous reaction of 18 hours (the mass ratio of the three reagents is 12.5:75:12.5, a total of 50 ml). After continuing the reaction for 18 hours, a compound of Formula (3) with a VBCB content of 75 wt % was obtained, wherein x+z=5-10, y=15-20, designated as A2.

Under the condition of 0° C. in iced water, 1 L of dehydrated THF was added into a Schlenk reaction flask, which was then vacuum-pumped in a liquid nitrogen environment and introduced with nitrogen, and the above operation was repeated three times; after that, the reaction was added with 0.0042 g of tert-butyllithium and stirred rapidly. St was first added, VBCB was then added after 6 hours of reaction, and St was added after continuous reaction of 6 hours (the mass ratio of the three reagents is 5:90:5, a total of 50 ml). After continuing the reaction for 6 hours, a compound of Formula (3) with a VBCB content of 90 wt % was obtained, wherein x+z=5-8, y=38-42, designated as A3.

Synthesis Example 2: Preparation of Ethylvinylbenzene-VBCB-Ethyl Vinylbenzene Block Copolymer Under the condition of 25° C., 1 L of dehydrated THF was added into a Schlenk reaction flask, which was then vacuum-pumped in a liquid nitrogen environment and introduced with nitrogen, and the above operation was repeated three times; after that, the reaction was added with 0.0027 g of n-butyllithium and stirred rapidly. m-Ethylvinylbenzene was first added, VBCB was then added after 12 hours of reaction, and m-ethylvinylbenzene was added after continuous reaction of 12 hours (the mass ratio of the three reagents is 12.5:75:12.5, a total of 50 ml). After continuing the reaction for 12 hours, a compound of Formula (5) with a VBCB content of 75 wt % was obtained, wherein x+z=15-19, y=50-54, designated as A4.

Synthesis Example 3: Preparation of DVB-VBCB-DVB Block Copolymer

Under the condition of 25° C., 1 L of dehydrated THF was added into a Schlenk reaction flask, which was then vacuum-pumped in a liquid nitrogen environment and introduced with nitrogen, and the above operation was repeated three times; after that, the reaction was added with 0.00054 g of n-butyllithium and stirred rapidly. o-Divinylbenzene (DVB) was first added, VBCB was then added after 4 hours of reaction, and DVB was added after continuous reaction of 4 hours (the mass ratio of the three reagents is 12.5:75:12.5, a total of 10 ml). After continuing the reaction for 4 hours, a compound of Formula (9) with a VBCB content of 75 wt % was obtained, wherein x+z=20-25, y=65-70, designated as A5.

Synthesis Example 4: Preparation of BVPE-VBCB-BVPE Block Copolymer

Under the condition of 25° C., 1 L of dehydrated THF was added into a Schlenk reaction flask, which was then vacuum-pumped in a liquid nitrogen environment and introduced with nitrogen, and the above operation was repeated three times; after that, the reaction was added with 0.00026 g of n-butyllithium and stirred rapidly. p-Bis(vinylphenyl)ethane (BVPE) was first added, VBCB was then added after 4 hours of reaction, and BVPE was added after continuous reaction of 4 hours (the mass ratio of the three reagents is 5:90:5, a total of 10 ml). After continuing the reaction for 4 hours, a compound of Formula (10) with a VBCB content of 90 wt % was obtained, wherein x+z=40-44, y=65-70, designated as A6.

Synthesis Example 5: Preparation of St-VBCB Random Copolymer 21 g of n-propyl acetate and 50 g of a mixture of VBCB and St (wherein the mass proportion of VBCB is 90%) were added to a reaction flask, stirred evenly, and then added with 0.28 g of boron trifluoride diethyl ether, followed by heating to 40° C. and reacting for 72 hours to obtain a compound of Formula (11) with a VBCB content of 90 wt %, wherein m=2-44, n=12-70, designated as A7.

50 g of n-butyl acetate and 50 g of a mixture of VBCB and St (wherein the mass proportion of VBCB is 55%) were added to a reaction flask, stirred evenly, and then added with 0.98 g of boron trifluoride methyl ether, followed by reacting at 20° C. for 36 hours to obtain a compound of Formula (11) with a VBCB content of 55 wt %, wherein m=2-44, n=12-70, designated as A8.

Synthesis Example 6: Preparation of Ethylvinylbenzene-VBCB Random Copolymer 70 g of tetrahydrofuran and 50 g of a mixture of VBCB and p-ethylvinyl benzene (wherein the mass proportion of VBCB is 75%) were added to a reaction flask, stirred evenly, and then added with 0.92 g of aluminium trichloride, followed by heating to 70° C. and reacting for 4 hours to obtain a compound of Formula (12) with a VBCB content of 75 wt %, wherein m=2-44, n=12-70, designated as A9.

Synthesis Example 7: Preparation of DVB-VBCB Random Copolymer 23 g of n-propyl acetate and 10 g of a mixture of VBCB and m-divinylbenzene (DVB) (wherein the mass proportion of VBCB is 75%) were added to a reaction flask, stirred evenly, and then added with 0.22 g of boron trifluoride diethyl ether, followed by heating to 40° C. and reacting for 4 hours to obtain a compound of Formula (16) with a VBCB content of 75 wt %, wherein m=2-44, n=12-70, designated as A10.

Synthesis Example 8: Preparation of BVPE-VBCB Random Copolymer 20 g of n-propyl acetate and 10 g of a mixture of VBCB and BVPE (wherein the mass proportion of VBCB is 90%) were added to a reaction flask, stirred evenly, and then added with 0.21 g of boron trifluoride diethyl ether, followed by heating to 40° C. and reacting for 4 hours to obtain a compound of Formula (18) with a VBCB content of 90 wt %, wherein m=2-44, n=12-70, designated as A11.

Synthesis Example 9: Preparation of St-VBCB Random Copolymer (with a VBCB Content of 50 wt %)

50 g of n-propyl acetate and 50 g of a mixture of VBCB and St (wherein the mass proportion of VBCB is 50%) were added to a reaction flask, stirred evenly, and then added with 1.09 g of boron trifluoride diethyl ether, followed by heating to 40° C. and reacting for 72 hours to obtain a St-VBCB random copolymer (with a VBCB content of 50 wt %), designated as B1.

Synthesis Example 10: Preparation of St-VBCB Random Copolymer (with a VBCB Content of 30 wt %)

50 g of n-propyl acetate and 50 g of a mixture of VBCB and St (wherein the mass proportion of VBCB is 30%) were added to a reaction flask, stirred evenly, and then added with 1.09 g of boron trifluoride diethyl ether, followed by heating to 40° C. and reacting for 72 hours to obtain a St-VBCB random copolymer (with a VBCB content of 30 wt %), designated as B2.

Synthesis Example 11: Preparation of VBCB Homopolymer (with a VBCB Content of 100 wt %)

50 g of n-propyl acetate and 50 g of VBCB were added to a reaction flask, stirred evenly, and then added with 1.09 g of boron trifluoride diethyl ether, followed by heating to 40° C. and reacting for 48 hours to obtain a VBCB homopolymer (with a VBCB content of 100 wt %), designated as B3.

Synthesis Example 12: Preparation of BCB-Modified DVB-St Copolymer (as Shown Below)

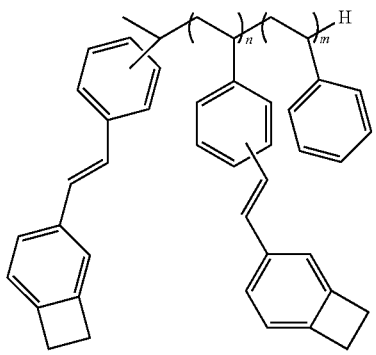

After a reactor was evacuated and introduced with nitrogen repeatedly for 3 times, 2.5 moles of 4-bromobenzocyclobutene, 7.5 moles of divinylbenzene, 0.0075 mole of palladium acetate, 0.03 mole of tris(o-methylphenyl)phosphine, 2.63 moles of triethylamine and 2 L of dry acetonitrile were added. The system was replaced with nitrogen again, followed by heating the water bath to 58° C. The reaction was completed after 48 hours, and a large amount of salt was precipitated after cooling to room temperature and then filtered with suction to remove the solid and palladium black. The filtrate was concentrated by rotary evaporation to remove the solvent, and then filtered with silica gel. The filtrate obtained by the suction filtration was distilled under reduced pressure at 80° C. to 90° C. to remove unreacted raw materials to obtain a brownish-yellow liquid, which was then purified by reduced pressure distillation successively at 90° C. and 150° C. to obtain a benzocyclobutene mono-substituted divinylbenzene monomer.

0.025 mole of the benzocyclobutene mono-substituted divinylbenzene monomer and 0.025 mole of styrene monomer were added to a single-necked bottle. The single-necked bottle were covered with a rubber stopper, which was then vacuum-pumped and introduced with nitrogen repeatedly for 3 times, followed by adding 22 ml of toluene by injection. The reaction was stirred at 100° C. for 10 hours, cooled to room temperature, and precipitated with methanol three times to obtain white powder, which is a BCB-modified DVB-St copolymer, designated as B4.

Compositions and test results of resin compositions of Examples and Comparative Examples are listed below (in part by weight):

TABLE 1

Resin compositions of Examples (in part by weight) and test results

| Component | | E1 | E2 | E3 | E4 | E5 | E6 |
|---|---|---|---|---|---|---|---|
| unsaturated bond-containing polyphenylene ether resin | SA9000 | 50 | 50 | 50 | 50 | 50 | 50 |
| | OPE-2st 2200 | 50 | 50 | 50 | 50 | 50 | 50 |
| | OPE-2st 1200 | | | | | | |
| copolymer | A1 | 100 | | | | | |
| | A2 | | 100 | | | | |
| | A3 | | | 100 | | | |
| | A4 | | | | 100 | | |
| | A5 | | | | | 100 | |
| | A6 | | | | | | 100 |
| | A7 | | | | | | |
| | A8 | | | | | | |
| | A9 | | | | | | |
| | A10 | | | | | | |
| | A11 | | | | | | |
| | B1 | | | | | | |
| | B2 | | | | | | |
| | B3 | | | | | | |
| | B4 | | | | | | |
| unsaturated bond-containing crosslinking agent | BVPE | 20 | 20 | 20 | 20 | 20 | 20 |
| | TAIC | | | | | | |
| | DVB | | | | | | |
| | VBCB | | | | | | |
| polyolefin | B-3000 | | | | | | |
| | Ricon 100 | | | | | | |
| | SBS-A | | | | | | |
| | H-1051 | | | | | | |
| inorganic filler | SC-2500 SVJ | 100 | 100 | 100 | 100 | 100 | 100 |
| curing accelerator | 25B | 0.5 | 0.5 | 0.5 | 0.5 | 0.5 | 0.5 |
| solvent | toluene | PA | PA | PA | PA | PA | PA |
| Item | Unit | E1 | E2 | E3 | E4 | E5 | E6 |
| Tg | ° C. | 240 | 250 | 265 | 250 | 260 | 260 |
| Z-PTE | % | 1.3 | 1.3 | 1.1 | 1.3 | 1.2 | 1.2 |
| multi-layer board heat resistance | / | ○○○ | ○○○ | ○○○ | ○○○ | ○○○ | ○○○ |
| IST | / | pass | pass | pass | pass | pass | pass |
| Df aging rate | % | 53 | 49 | 39 | 55 | 54 | 56 |

TABLE 1-continued

Resin compositions of Examples (in part by weight) and test results

| Component | | E1 | E2 | E3 | E4 | E5 | E6 |
|---|---|---|---|---|---|---|---|
| TcDk | ppm/° C. | 3.8 | 3.7 | 3.4 | 3.7 | 3.8 | 3.7 |
| TcDf | ppm/° C. | 1702 | 1617 | 1526 | 1666 | 1649 | 1695 |
| branch-like pattern | / | pass | pass | pass | pass | pass | pass |

TABLE 2

Resin compositions of Examples (in part by weight) and test results

| Component | | E7 | E8 | E9 | E10 | E11 | E12 |
|---|---|---|---|---|---|---|---|
| unsaturated bond-containing polyphenylene ether resin | SA9000 | 50 | 50 | 50 | 50 | 50 | 50 |
| | OPE-2st 2200 | 50 | 50 | 50 | 50 | 50 | 50 |
| | OPE-2st 1200 | | | | | | |
| copolymer | A1 | | | | | | |
| | A2 | 20 | 150 | 100 | 100 | | |
| | A3 | | | | | | |
| | A4 | | | | | | |
| | A5 | | | | | | |
| | A6 | | | | | | |
| | A7 | | | | | 100 | |
| | A8 | | | | | | 100 |
| | A9 | | | | | | |
| | A10 | | | | | | |
| | A11 | | | | | | |
| | B1 | | | | | | |
| | B2 | | | | | | |
| | B3 | | | | | | |
| | B4 | | | | | | |
| unsaturated bond-containing crosslinking agent | BVPE | 20 | 20 | 10 | 40 | 20 | 20 |
| | TAIC | | | | | | |
| | DVB | | | | | | |
| | VBCB | | | | | | |
| polyolefin | B-3000 | | | | | | |
| | Ricon 100 | | | | | | |
| | SBS-A | | | | | | |
| | H-1051 | | | | | | |
| inorganic filler | SC-2500 SVJ | 100 | 100 | 100 | 100 | 100 | 100 |
| curing accelerator | 25B | 0.5 | 0.5 | 0.5 | 0.5 | 0.5 | 0.5 |
| solvent | toluene | PA | PA | PA | PA | PA | PA |
| Item | Unit | E7 | E8 | E9 | E10 | E11 | E12 |
| Tg | ° C. | 233 | 263 | 240 | 271 | 248 | 230 |
| Z-PTE | % | 1.3 | 1.1 | 1.3 | 1.0 | 1.4 | 1.5 |
| multi-layer board heat resistance | / | ○○○ | ○○○ | ○○○ | ○○○ | ○○○ | ○○○ |
| IST | / | pass | pass | pass | pass | pass | pass |
| Df aging rate | % | 58 | 42 | 45 | 49 | 78 | 80 |
| TcDk | ppm/° C. | 4.0 | 3.4 | 3.5 | 3.6 | 4.8 | 4.7 |
| TcDf | ppm/° C. | 1742 | 1539 | 1610 | 1631 | 2441 | 2433 |
| branch-like pattern | / | pass | pass | pass | pass | pass | pass |

TABLE 3

Resin compositions of Examples (in part by weight) and test results

| Component | | E13 | E14 | E15 | E16 | E17 |
|---|---|---|---|---|---|---|
| unsaturated bond-containing polyphenylene ether resin | SA9000 | 50 | 50 | 50 | 50 | 50 |
| | OPE-2st 2200 | 50 | 50 | 50 | 30 | 30 |
| | OPE-2st 1200 | | | | 20 | 20 |
| copolymer | A1 | | | | | |
| | A2 | | | | 30 | 10 |
| | A3 | | | | | 20 |
| | A4 | | | | 20 | 10 |
| | A5 | | | | 20 | 10 |
| | A6 | | | | 10 | 20 |
| | A7 | | | | | |
| | A8 | | | | | |
| | A9 | 100 | | | | |
| | A10 | | 100 | | | |

TABLE 3-continued

Resin compositions of Examples (in part by weight) and test results

| | Component | E13 | E14 | E15 | E16 | E17 |
|---|---|---|---|---|---|---|
| | A11 | | | 100 | | |
| | B1 | | | | | |
| | B2 | | | | | |
| | B3 | | | | | |
| | B4 | | | | | |
| unsaturated | BVPE | 20 | 20 | 20 | 15 | 10 |
| bond-containing | TAIC | | | | 5 | 10 |
| crosslinking | DVB | | | | 5 | 10 |
| agent | VBCB | | | | | |
| polyolefin | B-3000 | | | | | |
| | Ricon 100 | | | | | |
| | SBS-A | | | | | |
| | H-1051 | | | | | |
| inorganic filler | SC-2500 SVJ | 100 | 100 | 100 | 120 | 150 |
| curing accelerator | 25B | 0.5 | 0.5 | 0.5 | 1.0 | 0.1 |
| solvent | toluene | PA | PA | PA | PA | PA |
| Item | Unit | E13 | E14 | E15 | E16 | E17 |
| Tg | ° C. | 245 | 253 | 255 | 280 | 280 |
| Z-PTE | % | 1.4 | 1.4 | 1.4 | 1.0 | 1.0 |
| multi-layer board heat resistance | / | ○○○ | ○○○ | ○○○ | ○○○ | ○○○ |
| IST | / | pass | pass | pass | pass | pass |
| Df aging rate | % | 80 | 80 | 82 | 35 | 36 |
| TcDk | ppm/° C. | 4.7 | 4.7 | 4.9 | 3.2 | 3.2 |
| TcDf | ppm/° C. | 2463 | 2439 | 2466 | 1500 | 1498 |
| branch-like pattern | / | pass | pass | pass | pass | pass |

TABLE 4

Resin compositions of Comparative Examples (in part by weight) and test results

| | Component | C1 | C2 | C3 | C4 | C5 | C6 |
|---|---|---|---|---|---|---|---|
| unsaturated | SA9000 | 50 | 50 | 50 | 50 | 50 | 50 |
| bond-containing | OPE-2st 2200 | 50 | 50 | 50 | 50 | 50 | 50 |
| polyphenylene | OPE-2st 1200 | | | | | | |
| ether resin | | | | | | | |
| copolymer | A1 | | | | | | |
| | A2 | 10 | 160 | | | | |
| | A3 | | | | | | |
| | A4 | | | | | | |
| | A5 | | | | | | |
| | A6 | | | | | | |
| | A7 | | | | | | |
| | A8 | | | | | | |
| | A9 | | | | | | |
| | A10 | | | | | | |
| | A11 | | | | | | |
| | B1 | | | 100 | | | |
| | B2 | | | | 100 | | |
| | B3 | | | | | 100 | |
| | B4 | | | | | | 100 |
| unsaturated | BVPE | 20 | 20 | 20 | 20 | 20 | 20 |
| bond-containing | TAIC | | | | | | |
| crosslinking | DVB | | | | | | |
| agent | VBCB | | | | | | |
| polyolefin | B-3000 | | | | | | |
| | Ricon 100 | | | | | | |
| | SBS-A | | | | | | |
| | H-1051 | | | | | | |
| inorganic filler | SC-2500 SVJ | 100 | 100 | 100 | 100 | 100 | 100 |
| curing accelerator | 25B | 0.5 | 0.5 | 0.5 | 0.5 | 0.5 | 0.5 |
| solvent | toluene | PA | PA | PA | PA | PA | PA |
| Item | Unit | C1 | C2 | C3 | C4 | C5 | C6 |
| Tg | ° C. | 205 | 265 | 230 | 215 | 270 | 225 |
| Z-PTE | % | 1.9 | 1.2 | 1.6 | 1.7 | 1.0 | 1.6 |
| multi-layer board heat resistance | / | ○○X | ○XX | ○○○ | XXX | ○XX | ○○○ |
| IST | / | NG | NG | NG | NG | NG | pass |
| Df aging rate | % | 140 | 75 | 125 | 133 | 94 | 200 |

TABLE 4-continued

Resin compositions of Comparative Examples (in part by weight) and test results

| Component | | C1 | C2 | C3 | C4 | C5 | C6 |
|---|---|---|---|---|---|---|---|
| TcDk | ppm/° C. | 8.1 | 4.7 | 5.2 | 6.1 | 4.3 | 9.0 |
| TcDf | ppm/° C. | 6650 | 2440 | 5555 | 5800 | 5202 | 7780 |
| branch-like pattern | / | NG | NG | NG | NG | NG | pass |

TABLE 5

Resin compositions of Comparative Examples (in part by weight) and test results

| | Component | C7 | C8 | C9 | C10 | C11 | C12 |
|---|---|---|---|---|---|---|---|
| unsaturated bond-containing polyphenylene ether resin copolymer | SA9000 | 50 | 50 | 50 | 50 | 50 | 50 |
| | OPE-2st 2200 | 50 | 50 | 50 | 50 | 50 | 50 |
| | OPE-2st 1200 | | | | | | |
| | A1 | | | | | | |
| | A2 | | | | | | |
| | A3 | | | | | | |
| | A4 | | | | | | |
| | A5 | | | | | | |
| | A6 | | | | | | |
| | A7 | | | | | | |
| | A8 | | | | | | |
| | A9 | | | | | | |
| | A10 | | | | | | |
| | A11 | | | | | | |
| | B1 | | | | | | |
| | B2 | | | | | | |
| | B3 | | | | | | |
| | B4 | | | | | | |
| unsaturated bond-containing crosslinking agent | BVPE | 20 | 20 | 20 | 20 | 20 | |
| | TAIC | | | | | | |
| | DVB | | | | | | |
| | VBCB | | | | | 100 | 20 |
| polyolefin | B-3000 | 100 | | | | | |
| | Ricon 100 | | 100 | | | | 100 |
| | SBS-A | | | 100 | | | |
| | H-1051 | | | | 100 | | |
| inorganic filler | SC-2500 SVJ | 100 | 100 | 100 | 100 | 100 | 100 |
| curing accelerator | 25B | 0.5 | 0.5 | 0.5 | 0.5 | 0.5 | 0.5 |
| solvent | toluene | PA | PA | PA | PA | PA | PA |
| Item | Unit | C7 | C8 | C9 | C10 | C11 | C12 |
| Tg | ° C. | 220 | 205 | 212 | 190 | 179 | 181 |
| Z-PTE | % | 1.7 | 1.9 | 1.8 | 2.1 | 2.3 | 2.3 |
| multi-layer board heat resistance | / | ○○X | ○XX | ○XX | XXX | XXX | XXX |
| IST | / | NG | NG | NG | NG | NG | NG |
| Df aging rate | % | 145 | 129 | 135 | 91 | 104 | 135 |
| TcDk | ppm/° C. | 8.7 | 5.8 | 6.5 | 4.2 | 4.4 | 6.3 |
| TcDf | ppm/° C. | 6770 | 5588 | 5809 | 5173 | 5215 | 5879 |
| branch-like pattern | / | NG | pass | NG | pass | NG | NG |

According to the present disclosure, for the property tests of Examples and Comparative Examples, samples (specimens) were prepared as described below and tested under specified conditions below.

1. Prepreg: Resin composition from each Example or each Comparative Example was individually well-mixed to form a varnish, which was then loaded to an impregnation tank; a fiberglass fabric (e.g., 2116 L-glass fiber fabric, 1080 L-glass fiber fabric or 1078 L-glass fiber fabric, all available from Asahi) was impregnated into the impregnation tank to adhere the resin composition onto the fiberglass fabric, followed by heating at 150° C. to 170° C. to B-stage to obtain a prepreg.

2. Copper-clad laminate (8-ply, formed by lamination of eight prepregs): Two 18 μm HVLP (hyper very low profile) copper foils and eight prepregs obtained from 2116 L-glass fiber fabrics impregnated with each Example or Comparative Example and having a resin content of about 53% were prepared and stacked in the order of one HVLP copper foil, eight prepregs and one HVLP copper foil, followed by lamination under vacuum at 420 psi and 200° C. for 2 hours to form a copper-clad laminate. Insulation layers between the two copper foils were formed by laminating and curing eight sheets of prepreg, and the resin content of the insulation layers is about 53%.

3. Copper-free laminate (8-ply, formed by lamination of eight prepregs): Each aforesaid copper-clad laminate (8-ply) was etched to remove the two copper foils to obtain a copper-free laminate (8-ply), which is formed by laminating eight sheets of prepreg and has a resin content of about 53%.

4. Copper-free laminate (2-ply, formed by lamination of two prepregs): Two 18 μm hyper very low profile (HVLP) copper foils and two prepregs obtained from 1080 L-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-clad laminate (2-ply, formed by lamination of two prepregs). Next, each copper-clad laminate (2-ply) was etched to remove the copper foils on both sides to obtain a copper-free laminate (2-ply) which is formed by laminating two prepregs and has a resin content of about 70%.

5. Four-layer board (formed by lamination of two prepregs and one copper-clad core): A prepreg (resin content of about 65%) prepared from a 1080 L-glass fiber fabric impregnated with each Example or each Comparative Example was superimposed on both sides with a piece of reverse treatment foil (RTF, 18 μm in thickness), followed by lamination and curing under vacuum at 420 psi and 200° C. for 2 hours to obtain a copper-clad core. The copper-clad core and two 18 μm hyper very low profile (HVLP) copper foils and two prepregs (obtained from 1078 L-glass fiber fabrics impregnated with each Example or Comparative Example, having a resin content of about 75%) were stacked in the order of one HVLP copper foil, one prepreg, one copper-clad core, one prepreg and one HVLP copper foil, followed by lamination under vacuum at 420 psi and 200° C. for 2 hours to form a copper-clad four-layer board, which was etched to remove the outermost copper foil to obtain the four-layer board.

For each sample, test items and test methods are described below.

1. Glass Transition Temperature (Tg)

Each copper-free laminate (8-ply) sample was subjected to the measurement of glass transition temperature (in ° C.) by using a dynamic mechanical analyzer (DMA) by reference to IPC-TM-650 2.4.24.4. Temperature interval during the measurement was set at 50° C.-400° C. with a temperature increase rate of 2° C./minute.

2. Z-Axis Ratio of Thermal Expansion (Percent of Thermal Expansion, Z-Axis, Z-PTE)

The copper-free laminate (8-ply) sample was subjected to thermal mechanical analysis (TMA). Each sample was heated from 50° C. to 260° C. at a heating rate of 10° C./minute and then subjected to the measurement of the percent (%) of thermal expansion in Z-axis in a temperature range of 50° C. to 260° C. by reference to IPC-TM-650 2.4.24.5.

3. Multi-Layer Board Heat Resistance

A prepreg (resin content of about 53%) prepared from a 2116 L-glass fiber fabric impregnated with each Example or each Comparative Example was superimposed on both sides with a piece of hyper very low profile copper foil (18 μm in thickness), followed by lamination and curing under vacuum at high temperature (200° C.) and high pressure (420 psi) for 2 hours to obtain a copper-clad core. Then the copper-clad core obtained above was etched to remove the copper foils on both sides so as to obtain a copper-free core (5 mil in thickness). Three copper-free cores were prepared as above. Next, two 18 μm HVLP copper foils and eight prepregs (resin content of about 70%) obtained from 1080 L-glass fiber fabrics impregnated with each Example or Comparative Example were prepared and stacked in the order of one copper foil, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), one copper-free core, two prepregs (obtained from 1080 L-glass fiber fabrics), and one copper foil, followed by lamination under vacuum at 420 psi and 200° C. for 2 hours to form an eight-layer copper-clad laminate. The eight-layer copper-clad laminate was then cut to form a 18 inch*16 inch rectangular sample, which was subjected to a circuit board drilling process to make a 20*25 array of through holes (500 through holes) with a diameter of 0.3 mm, the vertical distance of adjacent hole walls being in six designs including 0.25/0.3/0.35/0.4/0.5/0.7 mm, six designs being a group, and a total of 24 groups being on the entire board, i.e., 72,000 through holes. Then the hole walls were copper-plated, two adjacent groups at the edge of the board or in the board were picked as a sample, and three samples were used in the multi-layer board heat resistance test.

Each aforesaid sample for multi-layer board heat resistance test was horizontally placed on (i.e., in contact with) the solder bath of a 288° C. solder pot; during each test, one surface of the sample was placed on the solder bath for 10 seconds and then removed therefrom and cooled at room temperature for 30 seconds, which was recorded as one round, and the sample was subjected to 10 rounds of test without overturning. The sample after 10 rounds of solder floating was sectioned at the drilled area and observed with an optical microscope to determine the presence or absence of delamination. Three specimens were tested for each Example or Comparative Example; if no delamination was observed, a designation of "0" was given, and if delamination was observed, a designation of "X" was given. For example, "OOO" represents no delamination in all three samples, "OOX" represents no delamination in two samples and delamination in one sample, "OXX" represents no delamination in one sample and delamination in two samples, and "XXX" represents delamination in all three samples. As used herein, delamination may refer to interlayer separation or blistering. Delamination may occur between any layers of a laminate. For example, interlayer separation between insulation layers is considered as delamination; for example, blistering or separation between a copper foil and an insulation layer is also considered as delamination.

4. Interconnect Stress Test (IST)

Interconnect stress test, also known as DC current induced thermal cycling test, is a rapid method for thermal stress test on PCB board products and is used to evaluate the reliability of the interconnect structure (through holes) of PCB board products.

According to the following structural configuration, the resin composition of each Example or each Comparative Example is made into a 26-layer PCB board sample, dried, and then subjected to the measurement of the resistance variation rate after 1000 cycles at room temperature–150° C.-room temperature (heating for 3 minutes and cooling for 2 minutes, a total 5 minutes as a cycle) by reference to IPC-TM-650 2.6.26 by using the model IST-HC manufactured by PWB Corp. as the interconnect stress test equipment. A resistance variation rate of greater than or equal to 10% represents unacceptable, and a designation of "NG" was given; on the contrary, a resistance variation rate of less than 10% represents acceptable, and a designation of "pass" was given.

The structural design of the 26-layer PCB board sample for interconnect stress test is as follows:

L1 One hyper very low profile (HVLP) copper foil in Hoz thickness (for circuit fabrication)
  Two prepregs made from 106 L-glass fiber fabrics having a resin content of 75%
L2 One hyper very low profile (HVLP) copper foil in Hoz thickness (for circuit fabrication)
  One core in 3 mil thickness made from 1086 L-glass fiber fabric L3 One hyper very low profile (HVLP) copper foil in Hoz thickness (for circuit fabrication)
  Two prepregs made from 106 L-glass fiber fabrics having a resin content of 75%
L4 One hyper very low profile (HVLP) copper foil in Hoz thickness (for circuit fabrication)
  One core in 3 mil thickness made from 1086 L-glass fiber fabric
L5 One hyper very low profile (HVLP) copper foil in Hoz thickness (for circuit fabrication)
  Two prepregs made from 106 L-glass fiber fabrics having a resin content of 75%
L6 One hyper very low profile (HVLP) copper foil in 1 oz thickness (for circuit fabrication)
  Two cores in a total of 3.5 mil thickness made from 1037 L-glass fiber fabrics
L7 One hyper very low profile (HVLP) copper foil in 1 oz thickness (for circuit fabrication)
  Two prepregs made from 106 L-glass fiber fabrics having a resin content of 75%
L8 One hyper very low profile (HVLP) copper foil in 1 oz thickness (for circuit fabrication)
  Two cores in a total of 3.5 mil thickness made from 1037 L-glass fiber fabrics
L9 One hyper very low profile (HVLP) copper foil in 1 oz thickness (for circuit fabrication)
  Two prepregs made from 106 L-glass fiber fabrics having a resin content of 75%
L10 One hyper very low profile (HVLP) copper foil in 1 oz thickness (for circuit fabrication)
  Two cores in a total of 4 mil thickness made from 106 L-glass fiber fabrics (closed area)
L11 One hyper very low profile (HVLP) copper foil in 2 oz thickness
  Two prepregs made from 1080 L-glass fiber fabrics having a resin content of 71%
L12 One hyper very low profile (HVLP) copper foil in 1 oz thickness (for circuit fabrication)
  Two cores in a total of 4 mil thickness made from 106 L-glass fiber fabrics
L13 One hyper very low profile (HVLP) copper foil in 2 oz thickness (for circuit fabrication)
  Three prepregs made from 1080 L-glass fiber fabrics having a resin content of 71%
L14 One hyper very low profile (HVLP) copper foil in 2 oz thickness (for circuit fabrication)
  Two cores in a total of 4 mil thickness made from 106 L-glass fiber fabrics
L15 One hyper very low profile (HVLP) copper foil in 1 oz thickness (for circuit fabrication)
  Two prepregs made from 1080 L-glass fiber fabrics having a resin content of 71%
L16 One hyper very low profile (HVLP) copper foil in 2 oz thickness
  Two cores in a total of 4 mil thickness made from 106 L-glass fiber fabrics (closed area)
L17 One hyper very low profile (HVLP) copper foil in 1 oz thickness (for circuit fabrication)
  Two prepregs made from 106 L-glass fiber fabrics having a resin content of 75%
L18 One hyper very low profile (HVLP) copper foil in 1 oz thickness (for circuit fabrication)
  Two cores in a total of 3.5 mil thickness made from 1037 L-glass fiber fabrics
L19 One hyper very low profile (HVLP) copper foil in 1 oz thickness (for circuit fabrication)
  Two prepregs made from 106 L-glass fiber fabrics having a resin content of 75%
L20 One hyper very low profile (HVLP) copper foil in 1 oz thickness (for circuit fabrication)
  Two cores in a total of 3.5 mil thickness made from 1037 L-glass fiber fabrics
L21 One hyper very low profile (HVLP) copper foil in 1 oz thickness (for circuit fabrication)
  Two prepregs made from 106 L-glass fiber fabrics having a resin content of 75%
L22 One hyper very low profile (HVLP) copper foil in Hoz thickness (for circuit fabrication)
  One core in 3 mil thickness made from 1086 L-glass fiber fabric
L23 One hyper very low profile (HVLP) copper foil in Hoz thickness (for circuit fabrication)
  Two prepregs made from 106 L-glass fiber fabrics having a resin content of 75%
L24 One hyper very low profile (HVLP) copper foil in Hoz thickness (for circuit fabrication)
  One core in 3 mil thickness made from 1086 L-glass fiber fabric
L25 One hyper very low profile (HVLP) copper foil in Hoz thickness (for circuit fabrication)
  Two prepregs made from 106 L-glass fiber fabrics having a resin content of 75%
L26 One hyper very low profile (HVLP) copper foil in Hoz thickness (for circuit fabrication)

As used herein, the 1 oz copper foil corresponds to a thickness of 35 μm, a Hoz copper foil corresponds to a thickness of 18 μm, and so on.

5. Dissipation Factor Aging Rate (Df Aging Rate)

The copper-free laminate (2-ply) was measured by using a microwave dielectrometer (available from AET Corp.) by reference to JIS C2565 at room temperature (about 25° C.) and under 10 GHz frequency to obtain the dissipation factor (Df) of each sample, designated as Df1. After the measurement is completed, the sample is placed in an oven at 125° C. for 240 hours, and the dissipation factor (Df) is measured again, designated as Df2. Df aging rate is calculated as follows: Df aging rate=((Df2−Df1)/Df1)*100%.

6. Temperature Coefficient of Dielectric Constant (TcDk)

The copper-free laminate (2-ply) was cut into a 8 cm*8 cm square specimen, which was tested by using a SPDR split post dielectric resonant cavity (available from Waveray) by reference to IPC-TM-650 2.5.5.13 at 10 GHz and 65% relative humidity to measure the change in dielectric constant (Dk) of the sample in a temperature range of 25° C. to 150° C. Lower temperature coefficient of dielectric constant (TcDk) represents less change in the dielectric constant (Dk) during temperature increase, which represents a more stable dielectric constant of the insulation layers of the copper-free laminate, such that a printed circuit board made from the copper-free laminate may achieve more stable signal transmission at high temperature.

7. Temperature Coefficient of Dissipation Factor (TcDf)

The copper-free laminate (2-ply) was cut into a 8 cm*8 cm square specimen, which was tested by using a SPDR split post dielectric resonant cavity (available from Waveray) by reference to IPC-TM-650 2.5.5.13 at 10 GHz and 65% relative humidity to measure the change in dissipation factor (Df) of the sample in a temperature range of 25° C. to 150° C. Lower temperature coefficient of dissipation factor (TcDf) represents less change in the dissipation factor (Df) during temperature increase, which represents a more stable dissipation factor of the insulation layers of the copper-free laminate, such that a printed circuit board made from the copper-free laminate may achieve higher signal integrity at high temperature.

8. Branch-Like Pattern of Laminate

The four-layer board was examined with naked eyes to determine whether a branch-like pattern exists at laminate edges. If a branch-like pattern appears on the edge of the four-layer board, a designation of "NG" was given (The illustration of branch-like pattern at laminate edges may refer to FIG. 6 in U.S. Pat. No. 10,889,672 B2). In contrast, if no branch-like pattern appears on the edge of the four-layer board, a designation of "pass" was given (The illustration of absence of branch-like pattern may refer to FIG. 8 in U.S. Pat. No. 10,889,672 B2).

The following observations can be made from Table 1 to Table 5.

1. In Examples E1-E17, the copolymer having a structural unit formed by a monomer of Formula (1) and a structural unit formed by a monomer of Formula (2) is used, wherein the monomer of Formula (1) may be, for example, styrene (St), ethylvinylbenzene, divinylbenzene (DVB) or bis(vinylphenyl)ethane (BVPE), and the monomer of Formula (2) may be, for example, 4-vinylbenzocyclobutene (VBCB). The copolymers of Examples E1-E10, E16 and E17 are block copolymers, and the copolymers of Examples E11-E15 are random copolymers. The copolymers of Comparative Examples C1 and C2 are block copolymers, the copolymers of Comparative Examples C3, C4 and C6 are random copolymers, VBCB homopolymer was used in Comparative Example C5, conventional polyolefins were used in Comparative Examples C7-C10 and C12, and VBCB monomer was used in Comparative Example C11.

2. Relative to a total of 100 parts by weight of the unsaturated bond-containing polyphenylene ether resin, Examples E1-E17 contain 20 to 150 parts by weight of the copolymer having a structural unit formed by a monomer of Formula (1) and a structural unit formed by a monomer of Formula (2); in contrast to using 10 parts by weight of the copolymer (Comparative Example C1) and using 160 parts by weight of the copolymer (Comparative Example C2), significant improvements in the following properties were achieved: multi-layer board heat resistance, interconnect stress test (IST) and branch-like pattern at laminate edges. In both Comparative Examples C1 and C2, delamination occurs in a multi-layer board heat resistance test; in contrast, in all Examples E1-E17, delamination does not occur in a multi-layer board heat resistance test. The resistance variation rate of Comparative Examples C1 and C2 in an interconnect stress test (IST) after 1000 cycles is greater than or equal to 10% (NG), while the resistance variation rate of Examples E1-E17 in an interconnect stress test (IST) after 1000 cycles is less than 10% (pass). Comparative Examples C1 and C2 both have branch-like pattern at laminate edges (NG), while Examples E1-E17 are all absent of branch-like pattern at laminate edges (pass).

3. In the copolymers used in Examples E1-E17, the content of the structural unit formed by the monomer of Formula (2) is 55 wt % to 90 wt %. In contrast to the copolymer having 50 wt % of structural unit formed by the monomer of Formula (2) (Comparative Example C3), the copolymer having 30 wt % of structural unit formed by the monomer of Formula (2) (Comparative Example C4), or the homopolymer having 100 wt % of structural unit formed by the monomer of Formula (2) (Comparative Example C5), significant improvements in the following properties were achieved: interconnect stress test (IST), Df aging rate, temperature coefficient of dissipation factor (TcDf) and branch-like pattern at laminate edges. The resistance variation rate of Comparative Examples C3-05 in an interconnect stress test (IST) after 1000 cycles is greater than or equal to 10% (NG), while the resistance variation rate of Examples E1-E17 in an interconnect stress test (IST) after 1000 cycles is less than 10% (pass). The Df aging rate of Comparative Examples C3-05 is greater than or equal to 94%, while the Df aging rate of Examples E1-E17 is less than or equal to 82%. The temperature coefficient of dissipation factor (TcDf) of Comparative Examples C3-05 is greater than 5200 ppm/° C., while the temperature coefficient of dissipation factor (TcDf) of Examples E1-E17 is less than or equal to 2500 ppm/° C. All Comparative Examples C3-05 have branch-like pattern at laminate edges (NG), while Examples E1-E17 are absent of branch-like pattern at laminate edges (pass).

4. The aforesaid copolymers were used in Examples E1-E17, in contrast to the BCB-modified DVB-St copolymer used in Comparative Example C6, significant improvements in the following properties were achieved: glass transition temperature (Tg), Z-axis ratio of thermal expansion (Z-PTE), Df aging rate, temperature coefficient of dielectric constant (TcDk) and temperature coefficient of dissipation factor (TcDf). The glass transition temperature (Tg) of Comparative Example C6 is 225° C., while the glass transition temperature (Tg) of Examples E1-E17 is greater than or equal to 230° C. The Z-axis ratio of thermal expansion (Z-PTE) of Comparative Example C6 is 1.6%, while the Z-axis ratio of thermal expansion (Z-PTE) of Examples E1-E17 is less than or equal to 1.5%. The Df aging rate of Comparative Example C6 is 200%, while the Df aging rate of Examples E1-E17 is less than or equal to 82%. The temperature coefficient of dielectric constant (TcDk) of Comparative Example C6 is 9.0 ppm/° C., while the temperature coefficient of dielectric constant (TcDk) of Examples E1-E17 is less than or equal to 4.9 ppm/° C. The temperature coefficient of dissipation factor (TcDf) of Comparative Example C6 is 7780 ppm/° C., while the temperature coefficient of dissipation factor (TcDf) of Examples E1-E17 is less than or equal to 2500 ppm/° C.

5. The aforesaid copolymers were used in Examples E1-E17, in contrast to the conventional polyolefin and/or VBCB monomer used in Comparative Examples C7-C12, significant improvements in the following properties were achieved: glass transition temperature (Tg), Z-axis ratio of thermal expansion (Z-PTE), multi-layer board heat resistance, interconnect stress test (IST), Df aging rate and temperature coefficient of dissipation factor (TcDf). The glass transition temperature (Tg) of Comparative Examples C7-C12 is less than or equal to 220° C., while the glass transition temperature (Tg) of Examples E1-E17 is greater than or equal to 230° C. The Z-axis ratio of thermal expansion (Z-PTE) of Comparative Examples C7-C12 is greater than or equal to 1.7%, while the Z-axis ratio of thermal expansion (Z-PTE) of Examples E1-E17 is less than or equal to 1.5%. In all Comparative Examples C7-C12, delamination occurs in a multi-layer board heat resistance test; in contrast, in all Examples E1-E17, delamination does not occur in a multi-layer board heat resistance test. The resistance variation rate of Comparative Examples C7-C12 in an interconnect stress test (IST) after 1000 cycles is greater than or equal to 10% (NG), while the resistance variation rate of Examples E1-E17 in an interconnect stress test (IST) after 1000 cycles is less than 10% (pass). The Df aging rate of Comparative Examples C7-C12 is greater than or equal to 91%, while the Df aging rate of Examples E1-E17 is less than or equal to 82%. The temperature coefficient of dissipation factor (TcDf) of Comparative Examples C7-C12 is greater than or equal to 5173 ppm/° C., while the temperature coefficient of dissipation factor (TcDf) of Examples E1-E17 is less than or equal to 2500 ppm/° C.

6. In addition, the copolymers of Examples E1-E10 and E16-E17 are block copolymers, and the copolymers of Examples E11-E15 are random copolymers. Block copolymers, in contrast to random copolymers, overall achieve significant improvements in the following properties: Z-axis ratio of thermal expansion (Z-PTE), Df aging rate, temperature coefficient of dielectric constant (TcDk) and temperature coefficient of dissipation factor (TcDf). The Z-axis ratio of thermal expansion (Z-PTE) of Examples E11-E15 is greater than or equal to 1.4%, while the Z-axis ratio of thermal expansion (Z-PTE) of Examples E1-E10 and E16-E17 is less than or equal to 1.3%. The Df aging rate of Examples E11-E15 is greater than or equal to 78%, while the Df aging rate of Examples E1-E10 and E16-E17 is less than or equal to 58%. The temperature coefficient of dielectric constant (TcDk) of Examples E11-E15 is greater than or equal to 4.7 ppm/° C., while the temperature coefficient of dielectric constant (TcDk) of Examples E1-E10 and E16-E17 is less than or equal to 4.0 ppm/° C. The temperature coefficient of dissipation factor (TcDf) of Examples E11-E15 is greater than or equal to 2433 ppm/° C., while the temperature coefficient of dissipation factor (TcDf) of Examples E1-E10 and E16-E17 is less than or equal to 1742 ppm/° C.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, comprising:
   (A) 100 parts by weight of an unsaturated bond-containing polyphenylene ether resin;
   (B) 20 parts by weight to 150 parts by weight of a copolymer, the copolymer having a structural unit formed by a monomer of Formula (1) and a structural unit formed by a monomer of Formula (2), and the content of the structural unit formed by the monomer of Formula (2) in the copolymer is 55 wt % to 90 wt %; and
   (C) 10 parts by weight to 40 parts by weight of an unsaturated bond-containing crosslinking agent;

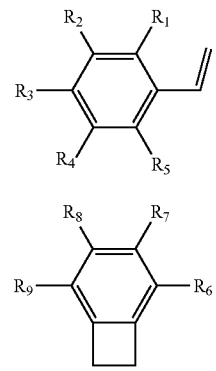

Formula (1)

Formula (2)

in Formula (1), $R_1$-$R_5$ are each independently selected from hydrogen atom, C1-C3 alkyl group, C2-C3 alkenyl group, phenyl group, phenyl group substituted by C1-C3 alkyl group, phenyl group substituted by C2-C3 alkenyl group and C2-C3 alkenyl phenyl C1-C3 alkylene;

in Formula (2), $R_6$-$R_9$ are each independently selected from hydrogen atom, C1-C3 alkyl group and C2-C3 alkenyl group, and at least one of $R_6$-$R_9$ is C2-C3 alkenyl group.

2. The resin composition of claim 1, wherein the unsaturated bond-containing polyphenylene ether resin comprises a vinylbenzyl group-containing polyphenylene ether resin, a (meth)acryloyl group-containing polyphenylene ether resin, a vinyl group-containing polyphenylene ether resin or a combination thereof.

3. The resin composition of claim 1, wherein the copolymer comprises a block copolymer, a random copolymer or a combination thereof.

4. The resin composition of claim 1, wherein the monomer of Formula (1) comprises a monomer of Formula (1-1), a monomer of Formula (1-2), a monomer of Formula (1-3), a monomer of Formula (1-4) or a combination thereof, and the monomer of Formula (2) comprises a monomer of Formula (2-1),

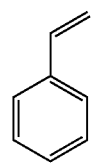

Formula (1-1)

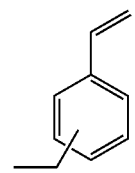

Formula (1-2)

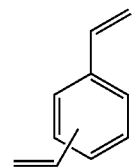

Formula (1-3)

-continued
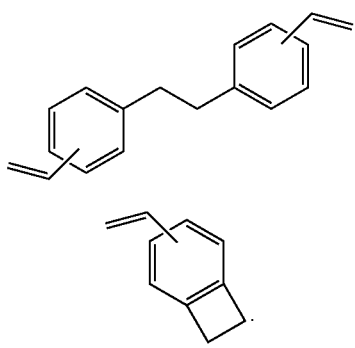
Formula (1-4)
Formula (2-1)
5. The resin composition of claim 1, wherein the copolymer comprises any copolymer of Formula (3) to Formula (18) below or a combination thereof:
Formula (3)
Formula (4)
Formula (5)
Formula (6)
Formula (7)
-continued
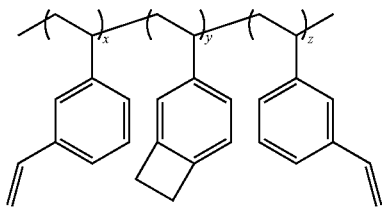
Formula (8)
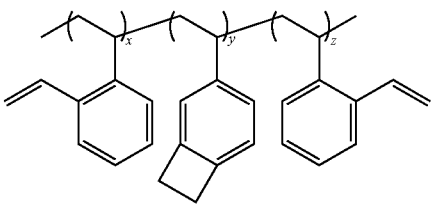
Formula (9)
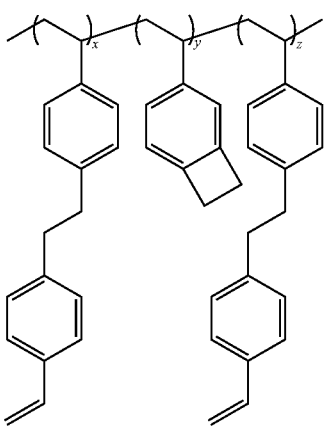
Formula (10)
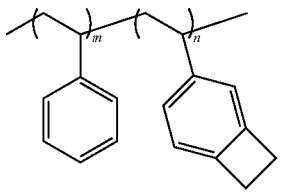
Formula (11)
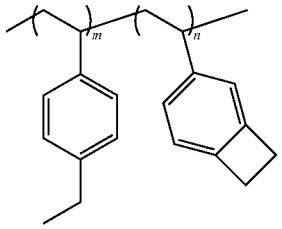
Formula (12)
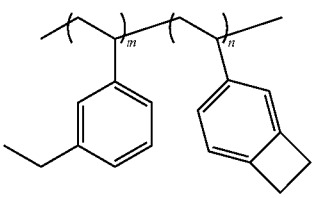
Formula (13)

Formula (14)
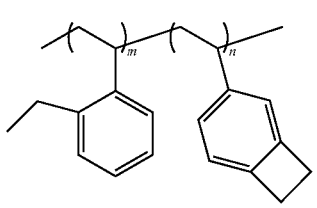

Formula (15)
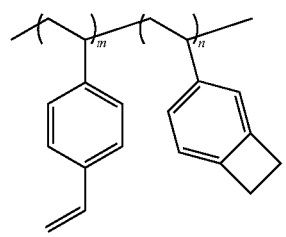

Formula (16)
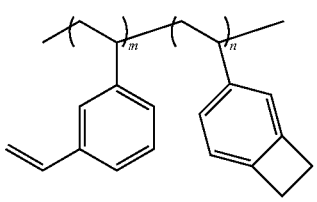

Formula (17)
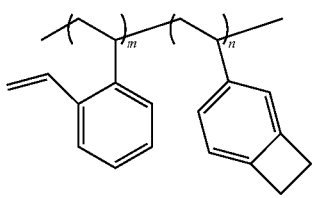

Formula (18)
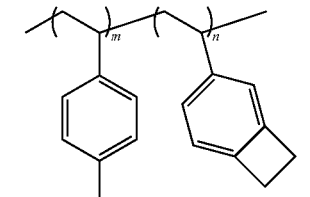

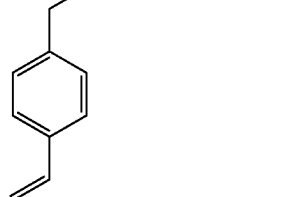

wherein m, n, x, y and z are each independently a positive integer, $2 \leq m \leq 44$, $12 \leq n \leq 70$, $2 \leq x+z \leq 44$, and $12 \leq y \leq 70$.

6. The resin composition of claim 1, wherein the unsaturated bond-containing crosslinking agent is bis(vinylphenyl)ethane, divinylbenzene, divinylnaphthalene, divinylbiphenyl, t-butyl styrene, triallyl isocyanurate, triallyl cyanurate, vinylbenzocyclobutene, bis(vinylbenzyl)ether, 1,2,4-trivinyl cyclohexane, diallyl isophthalate, diallyl bisphenol A, acrylate, butadiene, decadiene, octadiene, vinylcarbazole, styrene or a combination thereof.

7. The resin composition of claim 1, further comprising a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin, a polyfunctional vinyl aromatic copolymer or a combination thereof.

8. The resin composition of claim 1, further comprising inorganic filler, flame retardant, curing accelerator, polymerization inhibitor, solvent, silane coupling agent, coloring agent, toughening agent or a combination thereof.

9. An article made from the resin composition of claim 1, comprising a prepreg, a resin film, a laminate or a printed circuit board.

10. The article of claim 9, having a glass transition temperature as measured by reference to IPC-TM-650 2.4.24.4 of greater than or equal to 230° C.

11. The article of claim 9, having a Z-axis ratio of thermal expansion as measured by reference to IPC-TM-650 2.4.24.5 of less than or equal to 1.5%.

12. The article of claim 9, having a resistance variation rate of less than 10% in an interconnect stress test as measured by reference to IPC-TM-650 2.6.26 after 1000 cycles.

13. The article of claim 9, having a dissipation factor aging rate of less than or equal to 82% calculated according to a dissipation factor as measured by reference to JIS C2565 at 10 GHz after being subject to standing still at 125° C. for 240 hours.

14. The article of claim 9, having a temperature coefficient of dielectric constant as measured by reference to IPC-TM-650 2.5.5.13 of less than or equal to 4.9 ppm/° C.

15. The article of claim 9, having a temperature coefficient of dissipation factor as measured by reference to IPC-TM-650 2.5.5.13 of less than or equal to 2500 ppm/° C.

* * * * *